United States Patent [19]

Hascic

[11] 4,430,125

[45] Feb. 7, 1984

[54] PROCESS OF MANUFACTURE OF A COMPOSITE MATERIAL AND COMPOSITE MATERIAL MANUFACTURED BY THIS PROCESS

[75] Inventor: Waldemar Hascic, Enzersdorf-Südstadt, Austria

[73] Assignee: Empex Mineral-Und Naturfaserprodukts AG, Villars-sur-Glane, Switzerland

[21] Appl. No.: 372,713

[22] Filed: Apr. 28, 1982

[30] Foreign Application Priority Data

May 11, 1981 [CH] Switzerland .......................... 3029/81

[51] Int. Cl.$^3$ .............................................. C04B 19/04
[52] U.S. Cl. .......................................... 106/81; 106/84
[58] Field of Search ...................................... 106/81, 84

[56] References Cited

U.S. PATENT DOCUMENTS

| 3,933,514 | 1/1976 | Banks et al. | 106/84 |
| 4,013,749 | 3/1977 | Henrikson | 264/128 |
| 4,263,048 | 4/1981 | Hacker | 106/84 |
| 4,298,554 | 11/1981 | Vogel et al. | 106/84 |

FOREIGN PATENT DOCUMENTS

| 2300724 | 7/1974 | Fed. Rep. of Germany | 106/82 |
| 2533007 | 2/1976 | Fed. Rep. of Germany | 106/84 |
| 557370 | 11/1943 | United Kingdom | 106/81 |
| 2007636 | 5/1979 | United Kingdom | 106/75 |

*Primary Examiner*—James Poer
*Attorney, Agent, or Firm*—Wender, Murase & White

[57] ABSTRACT

For manufacturing a composite material, organic fibrous material like paper, straw, hay, grasses, moss, leaves, reed is mixed with alkali silicate and a fluosilicate as well as with a metallic oxide or a basic metallic silicate forming a higher melting silicate and submitted to a treatment under pressure and temperature. This produces a composite material having high mechanical strength and fire-proof quality.

15 Claims, No Drawings

PROCESS OF MANUFACTURE OF A COMPOSITE MATERIAL AND COMPOSITE MATERIAL MANUFACTURED BY THIS PROCESS

BACKGROUND OF THE INVENTION

The present invention relates to a process of manufacture of a composite material whereby a mixture of fibrous material, alkali silicate and fluosilicate is fashioned, said mixture being molded and hardened.

From DE-OS No. 2 300 724 a similar manufacturing process is known in which one seeks a very short hardening time by adding to the mixture a practically stoichiometrical quantity of fluosilicate. However, experiments have shown that such a short hardening time is not absolutely desired because it is associated with important disadvantages. During the manufacture of a mixture of fibrous material it may already happen that too little time is at disposal for permitting a good mixing up and a subsequent molding of the mixture before the hardening process starts or has progressed too far. In order to avoid the forming of a crystalline, sandlike structure of the hardened binding agent the fluosilicate is added finely grinded. With regard to the fact that fluosilicates are toxic, the addition of high amounts of grinded fluosilicates is unfavourable. The mechanical strength, in spite of the high amount of fluosilicate, is not very high because no linear growing chains are produced but instead, as already explained, a sandlike structure of the $SiO_2$. The fire-proof quality also leaves much to be desired.

An object of the present invention is to attain high mechanical strength and fire-proof quality associated with more favourable technical conditions of manufacturing.

SUMMARY OF THE INVENTION

The process according to the present invention is characterized in that said mixture is fashioned with a lower than stoichiometrical quantity of fluosilicate, a metallic oxide or a basic metallic silicate forming a higher melting silicate being added to said mixture and hardened under application of pressure and temperature.

DESCRIPTION OF THE PREFERRED EMBODIMENTS

Experiments show that also with a lower than stoichiometrical quantity of fluosilicate it is possible to ensure a complete hardening of the binding agent under favourable conditions. It is possible e.g. to add to 100 parts in weight of sodium silicate (ratio $Na_2O$ to $SiO_2 = 1$ to 3.5; 40° Be) 2 to 5 parts in weight of zinc fluosilicate ($ZnSiF_6 \times 6H_2O$). This produces the formation of linear chains of molecules of silicic acid which in its turn provides a high mechanical strength. Preferably, the fluosilicate is added to an aqueous solution which facilitates not only the mixing process but produces also an adhesive binding agent mixture which sticks well to the loadings, more particularly to fibrous materials, respectively produces a good wetting of these fibrous materials thus contributing to a higher mechanical strength of the produced composite material. The addition of lower than stoichiometrical quantities of fluosilicates leaves the alkali silicate free which with the metallic oxide or the basic metallic silicate is converted into a higher melting silicate during the warming up of the molded mixture. This increases very much the fire-proof quality of the composite material.

From GB No. 2 007 636 it is also known to harden a foaming silicate through addition of a quantity at least stoichiometrical of fluosilicate and to add to the mixture basic metallic silicates, e.g. clay or wollastonite as loading. However, it is not to recognize or not been recognized that it all depends on the combination of the measures, that is to add a lower than stoichiometrical quantity of fluosilicate to a higher melting silicate formed by metallic oxides or basic metallic silicates.

It is also particularly advantageous to utilize natural fibrous materials as structure building up components. It has been found that such fibrous materials combine well with alkali water-glass which is due possibly to the favourable surface structure of these materials. At the same time, these substances provide favourable values of tensile strength because of their fibrous contents and they avoid in this way the brittleness of the composite material.

For achieving particular properties it could be well suited to utilize a mixture of different natural fibrous materials.

With respect to the processing and for a favourable network structure it has been found adequate when the alkali water-glass is a sodium silicate with 35° to 40° Bé. It has also been found, in accordance with the present invention, that it is advantageous when the fluosilicates are magnesium, calcium, zinc, aluminium, copper, chrome, lead or iron fluosilicates. Mixtures of these fluosilicates may also be used.

In order to achieve favourable specific weights of the composite material which are significant for the thermal and acoustical insulation, it is avantageous when the part of the binding agent related to the composite material has a value of 10 to 80, preferably 10 to 40 percent in weight.

An optimum processing and network characteristic of the alkali silicate is achieved when the part of the fluosilicate related to the alkali silicate is 1 to 10, preferably 4 to 6 percent in weight. Under 1 percent in weight the part of the fluosilicate may well produce a favourable mechanical strength provided the hardening time is extended but the economy of the process of manufacture of composite materials may be questioned. A part greater than 10 percent in weight of the fluosilicate produces no better effect any more.

An optimum fire-proof quality is achieved when the metallic oxide which produces with the alkali water-glass through the influence of heat a higher melting silicate, is an oxide of the elements aluminium, magnesium beryllium or titanium. More particularly aluminium oxide has been found particularly advantageous. In the place of pure metallic oxides it is also possible to use basic silicates like kaolin, talc or similar.

The efficiency of the metallic oxide for the application of the composite material as a construction element is particularly favourable when its part related to the alkali silicate is 3 to 25, preferably 3 to 15 percent in weight. This efficieny may be proved by the following examples.

For all examples, a same mixture of 60 g perlite with 60 g sodium silicate ($Na_2O$ to $SiO_2 = 1$ to 3.5) and a solution of 1 g zinc fluosilicate in water was utilized. To this mixture were added alternative quantities of talc (basic magnesium silicate) for increasing the fire-proof quality:

Example 1:

no use of talc
  combustion depth (15 minutes under the flame of a Bunsen-burner at 1,000° C.): 8 mm plus pipes
Example 2:
  addition of talc: 3.1 g
  combustion depth: 7 mm (plus pipes)
Example 3:
  addition of talc: 6.2 g
  combustion depth: 4.5 mm (plus great cracks)
Example 4:
  addition of talc: 9.4 g
  combustion depth: 3.5 mm (formation of great cracks)
Example 5:
  addition of talc: 12.5 g
  combustion depth: 2.5 mm (formation of very small cracks)
Example 6:
  addition of talc: 15 g
  combustion depth: 2 mm (formation of very small cracks)

The foregoing examples prove that the addition of metallic oxides or basic metallic silicates improves greatly the fire-proof quality, whereby due to the forming of a higher melting layer of silicate the formation of pipes and cracks is substantially reduced.

A further improvement of the fire-proof quality may be obtained when sand, chalk, blowing clay, perlite, kaolin, clays, ashes, foaming glass wastes or similar elements are used as loadings. These refractory materials improve the fire-proof quality not only because of their intrinsic properties but also because of their thermal capacity. A content of loading is particularly indicated for the manufacture of the composite material because it permits to control very well the consistency of the mixture not yet hardened and to avoid an unproper agglomerate. In this regard, it has been found advantageous when the part of loading related to the finished composite material is comprised between 10 and 80, preferably between 15 and 30 percent in weight.

An adequate process of manufacture of a composite material consists in that natural fibrous material which is reduced to pieces with a length of 2 to 4 cm and a width of 2 to 4 mm is mixed up with a mixture of alkali water-glass, fluosilicate and loading, whereby the mixture is filled into molds and hardened under pressure and temperature.

Through the reduction of the natural fibrous material to the indicated dimensions it is possible to achieve a good felting of the broken material, whereby in the hardened composite material a network structure is formed which improves the mechanical strength. The strips are joined together at their regions of contact by the hardened alkali water-glass. The hardening of the mixture may not only occur in a mold but the composite material may be also continuously processed, e.g. in that the mixture is laid down on a moving path like a plate conveyor and hardened on the latter. This permits to manufacture plates of building materials in a particularly economical process.

It is advantageous when using strandlike natural fibrous materials like reed, straw, grass that the strands are separated lengthwise. In this way the tube forming the strand is opened, whereby the binding agent sticks also to the inner wall of the strand.

In order to achieve favourable mechanical properties it is advantageous when the hardening process occurs under a pressure between 3 and 4 kg/cm$^2$ and a temperature between 180° and 200° C. during an intervall of time between 7 and 10 minutes.

The invention is described with more details by the following examples:

EXAMPLE 1

21 kg straw is cut and split. The straw is then mixed with 100 kg of sodium silicate. After good mixing up, 23 kg kaolin, 5 kg aluminium fluosilicate dissolved in water and 24 kg perlite are added. After intensive mixing up the mixture is transferred into a press and hardened during 7 minutes under a pressure of 3 kg/cm$^2$ and a temperature of 180° C.

The resulting plate has a specific weight of 0.38 g/cm$^3$.

EXAMPLE 2

20 kg paper snippings (length 2 to 4 cm, width 2 to 4 mm) are mixed with 55 kg of sodium silicate and 10 kg kaolin. In parallel a second mixture of 128 kg perlite, 80 kg of sodium silicate, 20 kg kaolin and 7.5 kg zinc fluosilicate dissolved in water is prepared.

Both mixtures are mixed together and the resulting raw mixture is hardened during 10 minutes into a press under a pressure of 3.5 kg/cm$^2$ and a temperature of 190° C.

The resulting composite material has a specific weight of 0.25 g/cm$^3$.

EXAMPLE 3

10 kg dry, cut and split grass is mixed with 30 kg sodium silicate, 5 kg kaolin, 2 kg perlite and 2 kg sodium fluosilicate dissolved in water.

The resulting raw mixture is hardened during 8 minutes into a press under a pressure of 4 kg/cm$^2$ and a temperature of 200° C.

The resulting composite material has a specific weight of 0.80 g/cm$^3$.

I claim:

1. A process for manufacturing a composite material consisting essentially of a mixture of a fibrous material, an alkali metal silicate, a fluosilicate, a member selected from the group consisting of a metallic oxide and a basic metallic silicate, which member is capable of reacting with the alkali metal silicate to form a silicate having a melting point which is higher than that of the alkali metal silicate, and, optionally, a filler, which comprises the steps of:
   (1) forming a mixture of a fibrous material, an alkali metal silicate, a lower than stoichiometric amount of a fluosilicate relative to said alkali metal silicate, a member selected from the group consisting of a metallic oxide and a base metallic silicate, said member being reactive with said alkali metal silicate and, optionally, a filler;
   (b) forming said mixture into the desired configuration; and
   (c) subjecting said formed mixture to heat and pressure to produce a hardened composite material having a high mechanical strength and fire-proof quality.

2. The process of claim 1, wherein said fluosilicate is added as an aqueous solution.

3. The process of claim 1, wherein from about 2 to about 5 parts of fluosilicate are added per 100 parts of alkali metal silicate.

4. The process of claim 2, wherein from about 2 to about 5 parts of fluosilicate are added per 100 parts of alkali metal silicate.

5. The process of claim 1, wherein from about 1 to about 10 parts of fluosilicate are added per 100 parts of alkali metal silicate.

6. The process of claim 1, wherein said fibrous material is a natural fibrous material which is reduced to pieces having a length of 2 to 4 cm and a width of 2 to 4 mm.

7. The process of claim 1, wherein said alkali silicate is a sodium silicate of 35° to 40° Be.

8. The process of claims 1 or 2, wherein said fluosilicate is selected from the group consisting of magnesium, calcium, zinc, aluminium, copper, lead, chrome and iron fluosilicate.

9. A composite material consisting essentially of an organic fibrous material held together by an inorganic binding agent, said inorganic binding agent consisting essentially of the reaction product of an alkali metal silicate, a lower than stoichiometric amount of a fluosilicate relative to said alkali metal silicate, and a metallic oxide or a basic metallic silicate which is capable of reacting with said alkali metal silicate to form a higher melting silicate.

10. The composite material according to claim 9, wherein the amount of said binding agent in the finished composite material is between about 10 and 80 percent by weight.

11. The composite material according to claims 9 or 10, wherein the amount of said fluosilicate relative to said alkali metal silicate is between about 1 and 10 percent by weight.

12. The composite material according to claim 9, wherein said metallic oxide is an oxide of aluminum, magnesium, beryllium, or titanium.

13. The composite material according to claim 9, wherein the amount of said metallic oxide relative to said alkali metal silicate is between about 3 to 25 percent by weight.

14. The composite material according to claim 9, further consisting essentially of a loading selected from the group consisting of sand, chalk, blowing clay, perlite, kaolin, clays, ashes, foaming glass wastes and mixtures thereof.

15. The composite material according to claim 14, wherein the amount of said loading relative to the finished composite material is from about 10 to 80 percent by weight.

* * * * *